Dec. 19, 1933. H. H. McKEE ET AL 1,940,005
VENDING METHOD AND DEVICE
Filed Aug. 21, 1929 3 Sheets-Sheet 1
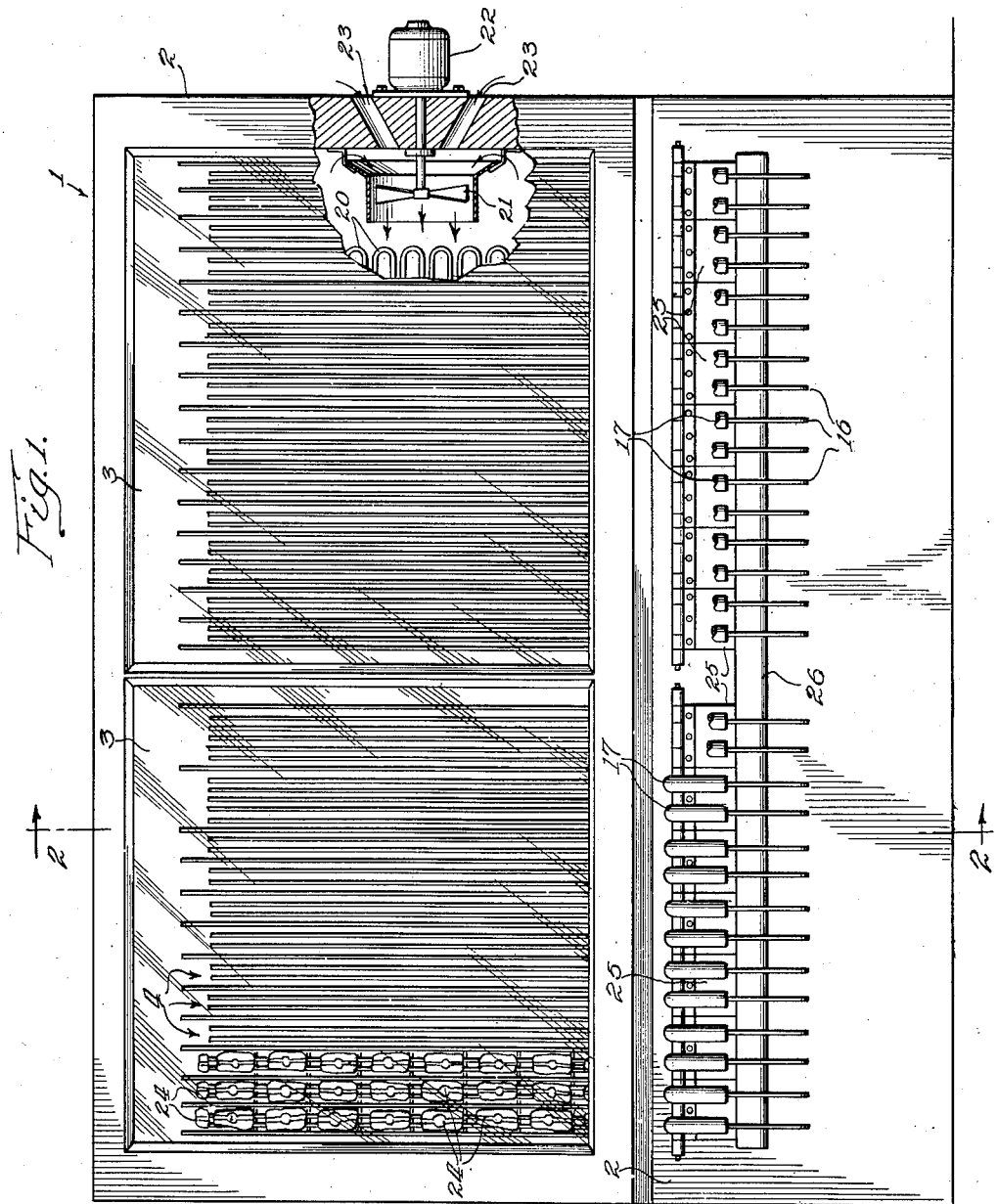
Inventors
Harry Henry McKee.
Charles Taylor Walter.

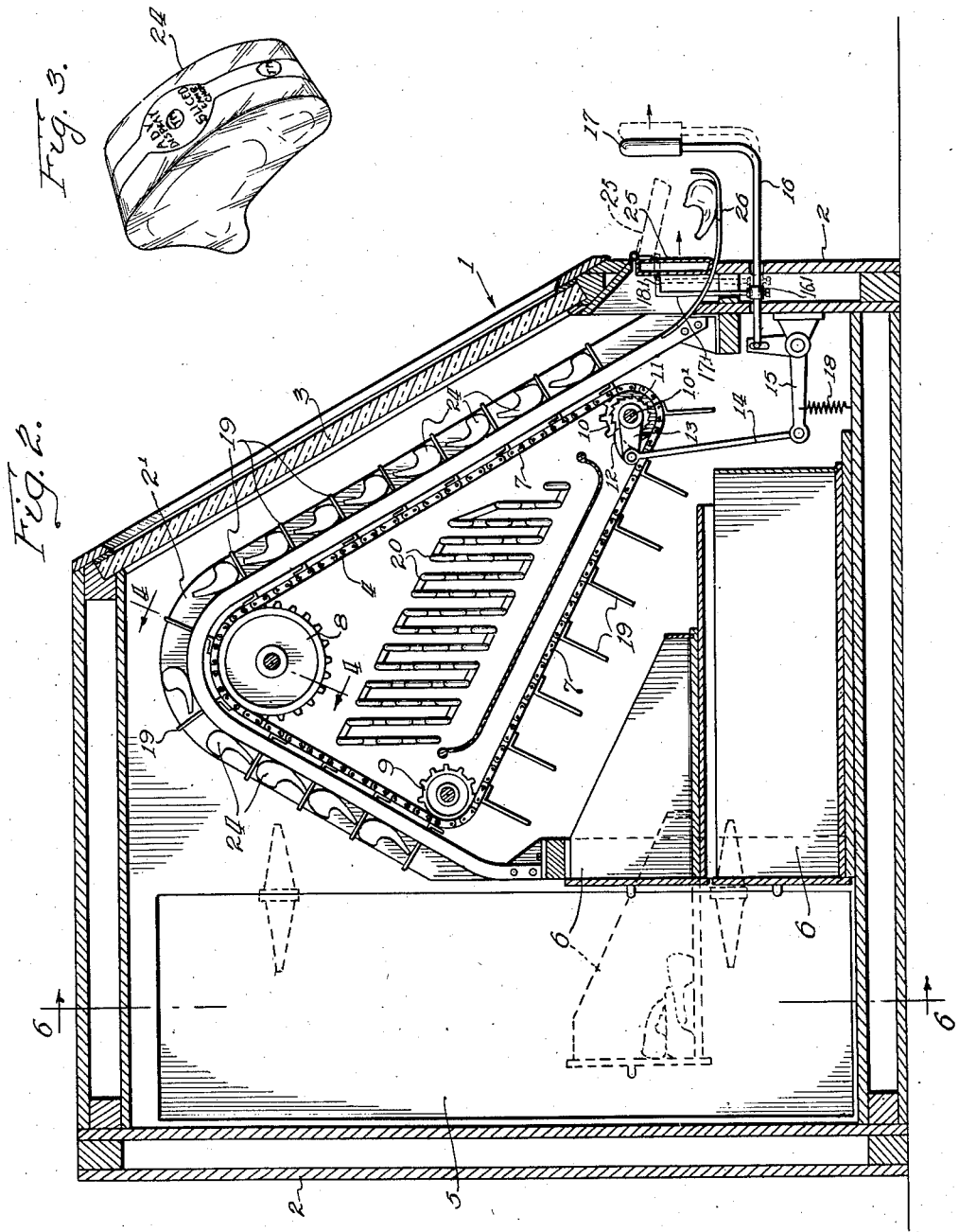

Dec. 19, 1933.  H. H. McKEE ET AL  1,940,005
VENDING METHOD AND DEVICE
Filed Aug. 21, 1929  3 Sheets-Sheet 3
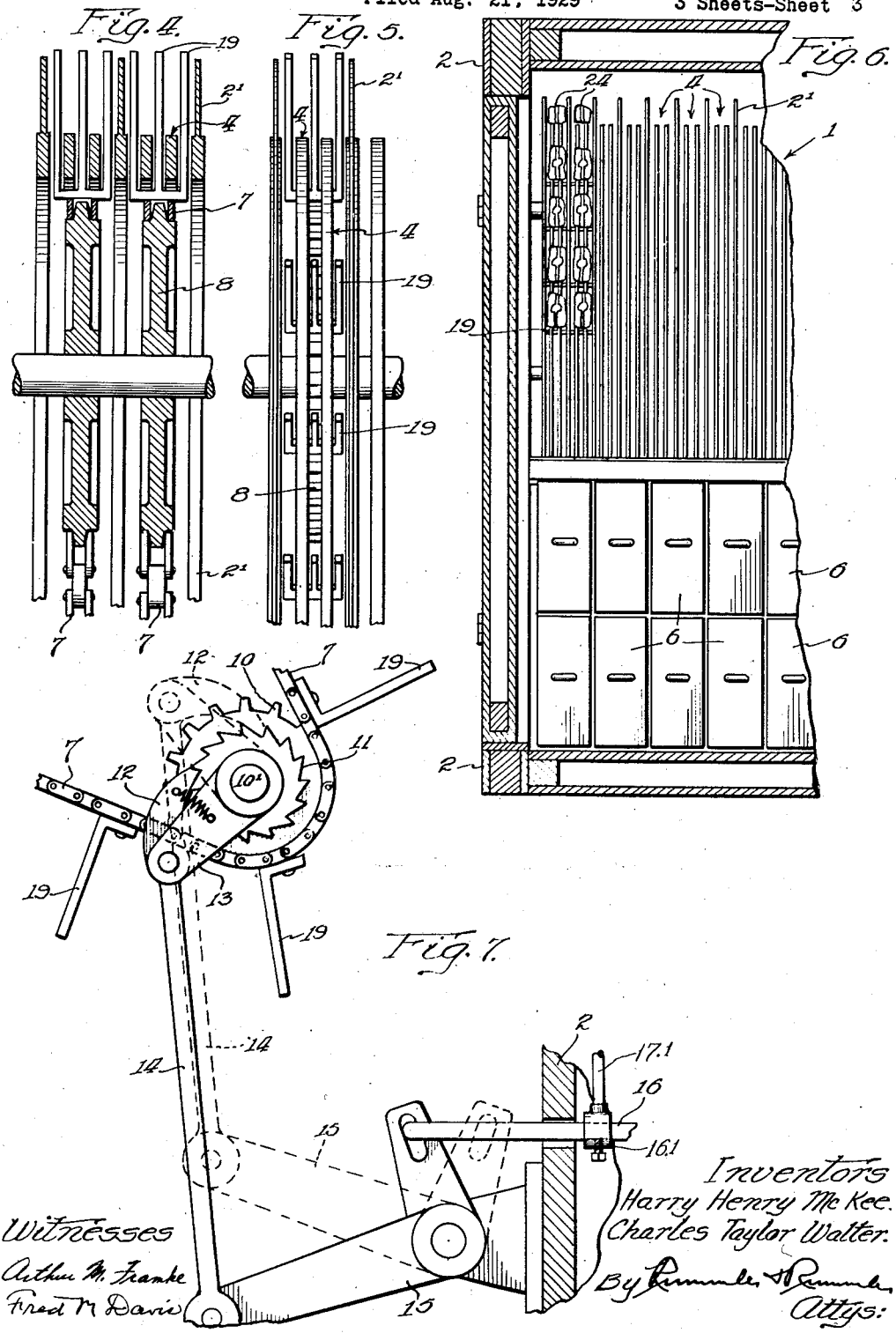

Patented Dec. 19, 1933

1,940,005

UNITED STATES PATENT OFFICE 1,940,005

VENDING METHOD AND DEVICE

Harry H. McKee and Charles T. Walter, Chicago, Ill., assignors, by mesne assignments, to Industrial Patents Corporation, Chicago, Ill., a corporation of Delaware Application August 21, 1929. Serial No. 387,364

3 Claims. (Cl. 312—36)

This invention relates to the retail merchandising of standardized package goods, including especially meats and the like which require refrigeration.

Heretofore it has been customary for the packing houses to supply meats in bulk to the retail markets where the clerks fill current orders by cutting up the meat and wrapping the same according to individual orders. Such meats are usually kept in built-in refrigerators or ice boxes, and in artificially cooled show cases. This old method of retailing has resulted in defective refrigeration and premature deterioration of the meat.

The main objects of this invention are to provide for better refrigeration of the meats in the retail shops, and especially to provide against sales and dispensing operations materially interfering with the desired temperature of the meat display counter or cabinet; to provide for suitably dispensing standardized meat packages either without the aid of a local butcher or sales clerk or with much less of such aid than was required heretofore; to provide thus for systematically dispensing meats of various kinds; to provide for automatically maintaining a desired and predetermined degree of temperature in the retail cabinet or dispenser; and to provide for ready supply of such packages to the dispensing mechanism consistently with a minimum amount of attention and labor.

An illustrative embodiment of this invention is shown by the accompanying drawings, in which Figure 1 is mainly a front elevation of a refrigerated automatic vending store fixture or cabinet, part being broken away at the right hand side to show the air circulating fan.

Fig. 2 is a cross section through the device of Fig. 1 from front to back, as on the line 2—2 of Fig. 1.

Fig. 3 is a perspective view of a standardized wrapped meat package, as for example, a package of sliced pork chops.

Fig. 4 is a fragmentary section on the line 4—4 of Fig. 2.

Fig. 5 is a front elevation of the upper part of the conveyor apparatus shown in Fig. 5, and is substantially an enlargement of a part of Fig. 1 with the glass front and cabinet removed.

Fig. 6 is a section on the line 6—6 of Fig. 2 showing one end of the vending device as a whole.

Fig. 7 is a much enlarged detailed view of the manual control mechanism which advances the conveyor step by step as sales are made.

In the construction shown in the drawings, the vending device or machine 1 as a whole, is adapted for installation in any retail store where it may be placed in any convenient position, as for example with its back adjacent to the wall of the building; the front being accessible to customers as they walk along an aisle or passageway in front of the device. This may extend for any desired distance, according to the capacity and needs of the store. The height of the device is preferably sufficient to give ample head room inside, for an attendant who may enter through a door located at one end of the device.

The device comprises mainly a tightly closed cabinet 2, having a glass front 3, a set of mutually independent dispensing conveyor mechanisms 4 visible through said front, a passageway 5 behind the mechanism to admit an attendant, supply drawers 6, beneath the conveyors, to receive sufficient quantities of goods from time to time, to enable frequent recharging of the conveyors 4 as their contents are currently removed by customers.

Each mechanism 4 comprises an endless chain 7 disposed triangularly in a vertical plane, a large wheel 8 to support the uppermost corner of the chain, a smaller wheel 9 to support the rearward corner of the chain and a similar sized wheel 10 of the sprocket type provided with a ratchet 11 to be actuated by the pawl 12, for driving the conveyor chain 7 step by step under manual operation by the customer. Said pawl is carried by a link 13 pivoted to the shaft 10' with wheel 10. Said link at its free end is pivoted to a link 14 which in turn is pivoted to one arm of a bell-crank lever 15, the other arm of which is operatively connected to a pull rod 16 having a handle 17 to be grasped by the customer. A spring 18 normally holds the rod 16 retracted. Each chain 7 has a series of pairs of outstanding arms 19 projecting between the fixed slideway skids 2 to assure positive movement of the goods. Guide walls 2' separate the conveyors 4.

Rigidly mounted on each rod 16 within the cabinet 1, is a collar 16.1 having an upright rod 17.1 which comprises a forwardly extending arm 18.1, the end of which registers with a delivery outlet and is extended into said outlet when the rod 16 is pulled outwardly.

In order to keep the device as a whole properly chilled a refrigerating system of any desired kind is provided. The kind shown comprises a set of cooling coils 20 disposed within the space which is surrounded by the conveyors 4. A fan 21, driven by the motor 22, as shown by Fig. 1, serves to circulate the air in the device and especially to drive it past the coils 20. Passageways 23 admit air from outside, to assure gradual renewal and replacement of air.

In the practice of this invention the packer delivers his supplies to the storage drawers or magazines 6, usually including various kinds of meats. Then the local clerk observes the conveyors from time to time, and as they become depleted he replenishes them from the drawers 6, each with its own kind of meat. The packages 24 shown in Figs. 2 and 3, represent wrapped packages of sliced pork chops.

The customer passes along the front of the device, chooses the product he desires to purchase, and pulls the corresponding handle 17. This advances the conveyor and causes it to discharge a package downward by gravity. When the rod 16 is moved in this manner the end of the arm 18.1 pushes open the trap door 25, allowing the package to pass through the outlet, and onto the platform or shelf 26. The spring 18 restores the operating mechanism readily for the next customer to use, and door 25 closes by gravity.

Although but one specific embodiment of this invention is herein shown and described, it is to be understood that numerous details of the construction and method set forth may be altered or omitted without departing from the spirit of this invention as defined by the following claims:

We claim:

1. A vending machine comprising a housing having a transparent portion, an endless conveyor located within the housing adapted to receive standardized meat packages for delivery to customers, the housing having a delivery outlet, a shelf extending outwardly through said outlet beyond the housing, a self-closing door for said outlet, operable to open to permit passage of a package through the outlet to said shelf, a rod slidable through a wall of the housing adjacent said outlet, means operatively connecting said rod and the endless conveyor whereby to operate the conveyor to move the same a predetermined distance upon movement of said rod in one direction, a door opening rod projecting from and affixed to the aforesaid rod and having an arm adapted to engage and force said door outwardly when the first mentioned rod is thus moved so as to thereby simultaneously advance the conveyor and open the door to deliver a package through the outlet onto the shelf and means to return said rod and door opening rod to their original position.

2. A vending machine comprising a housing having a transparent wall, an endless conveyor located within the housing adapted to receive standardized meat packages for delivery to customers, the housing having a delivery outlet, a shelf extending outwardly through said outlet beyond the housing, a normally closed door for said outlet and operable to open to permit passage of a package through the outlet onto said shelf, a ratchet mechanism operatively connected to the endless conveyor, a pull rod slidable through a wall of the housing adjacent said outlet, means operatively connecting said rod and said ratchet mechanism whereby to move the endless conveyor step by step, and means carried by said rod and movable therewith to operate against said door to open the latter as the ratchet mechanism is operated by said rod to effect a predetermined movement of the conveyor and to permit discharge of a package through said outlet onto said shelf.

3. A vending machine comprising a housing, fixed slide-way skids arranged therein, a plurality of endless chains operable in the housing and having outstanding arms extending between the slide-way skids and adapted to effect positive movement of packages arranged on the slide-way skids upon operation of the respective chains, the housing having a plurality of delivery outlets, one for coaction with each endless chain, a shelf extending outwardly through each outlet beyond the housing, a normally closed door for each outlet, pull rods slidable through a wall of the housing, one adjacent each of said delivery outlets, means operatively connecting each rod with the respective endless chain whereby to move the latter a predetermined distance on a pull upon said rod, a second rod projecting from each of the respective aforesaid rods and having an arm adapted to engage and force the respective door outwardly when said rod is pulled upon so as to thereby simultaneously advance the respective chain and open the respective closure to deliver a package through the respective outlet onto the respective shelf.

HARRY H. McKEE.
CHARLES T. WALTER.